United States Patent
Mao et al.

(10) Patent No.: US 11,913,888 B2
(45) Date of Patent: Feb. 27, 2024

(54) SOLID IMMERSION LENS UNIT AND SEMICONDUCTOR INSPECTION DEVICE

(71) Applicant: HAMAMATSU PHOTONICS K.K., Hamamatsu (JP)

(72) Inventors: Xiangguang Mao, Hamamatsu (JP); Masanori Kobayashi, Hamamatsu (JP); Hirotoshi Terada, Hamamatsu (JP); Ikuo Arata, Hamamatsu (JP); Masataka Ikesu, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 239 days.

(21) Appl. No.: 17/264,588

(22) PCT Filed: Apr. 9, 2019

(86) PCT No.: PCT/JP2019/015510
§ 371 (c)(1),
(2) Date: Jan. 29, 2021

(87) PCT Pub. No.: WO2020/026531
PCT Pub. Date: Feb. 6, 2020

(65) Prior Publication Data
US 2021/0333216 A1    Oct. 28, 2021

(30) Foreign Application Priority Data
Aug. 2, 2018  (JP) ................................. 2018-145977

(51) Int. Cl.
*G01N 21/88* (2006.01)
*G01N 21/95* (2006.01)
(Continued)

(52) U.S. Cl.
CPC ..... *G01N 21/8806* (2013.01); *G01N 21/9505* (2013.01); *G02B 21/02* (2013.01); *G02B 21/33* (2013.01); *G02B 21/361* (2013.01)

(58) Field of Classification Search
CPC ........... G01N 21/8806; G01N 21/9505; G02B 21/02; G02B 21/33; G02B 21/36;
(Continued)

(56) References Cited

U.S. PATENT DOCUMENTS

| | | | |
|---|---|---|---|
| 6,876,501 B2 * | 4/2005 | Kimura ................ | G11B 7/1376 359/719 |
| 2004/0021951 A1 * | 2/2004 | Maeda ................... | G02B 27/62 |

(Continued)

FOREIGN PATENT DOCUMENTS

| | | |
|---|---|---|
| CN | 1906520 A | 1/2007 |
| CN | 105044894 A | 11/2015 |

(Continued)

OTHER PUBLICATIONS

International Preliminary Report on Patentability dated Feb. 11, 2021 for PCT/JP2019/015510.

(Continued)

*Primary Examiner* — Tri T Ton
(74) *Attorney, Agent, or Firm* — Faegre Drinker Biddle & Reath LLP

(57) ABSTRACT

A solid immersion lens unit includes a solid immersion lens having a contact surface for coming into contact with semiconductor device formed of a silicon substrate and a spherical surface to be disposed to face an objective lens; a holder holding the solid immersion lens; and an optical element held by the holder to be positioned between the objective lens and the solid immersion lens. The solid immersion lens transmits light having at least a part of wavelength in a range of 200 nm or greater and 1100 nm or (Continued)

lower. The optical element corrects aberration caused by a difference in refractive indices between the silicon substrate and the solid immersion lens.

6 Claims, 3 Drawing Sheets

(51) Int. Cl.
*G02B 21/02* (2006.01)
*G02B 21/33* (2006.01)
*G02B 21/36* (2006.01)

(58) Field of Classification Search
CPC .................. G02B 21/361; G02B 1/02; G02B 2003/0093; G02B 7/021; H01L 22/30
USPC ................ 356/237.1–237.6, 239.1–239.8
See application file for complete search history.

(56) References Cited

U.S. PATENT DOCUMENTS

| | | | |
|---|---|---|---|
| 2005/0190436 A1 | 9/2005 | Terada et al. | |
| 2006/0176548 A1* | 8/2006 | Terada | G01N 21/956 359/368 |
| 2016/0091797 A1* | 3/2016 | Ryzhikov | G02B 13/143 356/237.2 |

FOREIGN PATENT DOCUMENTS

| | | |
|---|---|---|
| GB | 691530 A | 5/1953 |
| JP | 2005-317170 A | 11/2005 |
| JP | 2006-227565 A | 8/2006 |
| JP | 2009-003133 A | 1/2009 |
| JP | 2009-070467 A | 4/2009 |
| JP | 2016-537670 A | 12/2016 |
| JP | 2017-501429 A | 1/2017 |
| TW | 200506340 A | 2/2005 |
| TW | I363867 B | 5/2012 |
| TW | I608306 B | 12/2017 |
| WO | WO-2015/071361 A1 | 5/2015 |
| WO | WO-2015/071363 A1 | 5/2015 |

OTHER PUBLICATIONS

Osamu Koyama, "A study of near field recording optics for cover-layer incident dual-layer disc with an NA=1.45 hemispherical solid immersion lens", Proc. SPIE 6282, Optical Data Storage 2006, Jun. 22, 2006, XP040227773.
B. B. Goldberg, et al., "Chromatic and spherical aberration correction for silicon aplanatic solid immersion lens for fault isolation and photon emission microscopy of integrated circuits", Microelectronics Reliability: An Internet Journal & World Abstracting Service, Elsevier Science Ltd, GB, vol. 51, No. 9, Jul. 13, 2011, p. 1637-p. 1639, XP028291302.

* cited by examiner

SOLID IMMERSION LENS UNIT AND SEMICONDUCTOR INSPECTION DEVICE

TECHNICAL FIELD

One aspect of the present disclosure relates to a solid immersion lens unit and a semiconductor inspection apparatus.

BACKGROUND ART

As a technique of observing a semiconductor device, there is known a technique of observing an internal structure from the surface opposite to a surface on which a device (an integrated circuit or the like) is formed by using a solid immersion lens (SIL) (for example, see Patent Literature 1). By bringing the contact surface of the solid immersion lens into close contact with the surface of the semiconductor device to realize evanescent coupling, the internal structure can be observed with high resolution.

CITATION LIST

Patent Literature

Patent Literature 1: Japanese Unexamined Patent Publication No. 2009-3133

SUMMARY OF INVENTION

Technical Problem

In the above-described observation technique, when the semiconductor device is formed of a silicon substrate, it is necessary to use light having a wavelength of 1200 nm or more that passes through silicon, but it is preferable to use light having a shorter wavelength in order to further improve the resolution. In addition, sharpness is also required for observation of semiconductor device.

It is an object of an aspect of the present disclosure to provide a solid immersion lens unit capable of achieving high resolution and clear observation, and a semiconductor inspection apparatus including such a solid immersion lens unit.

Solution to Problem

A solid immersion lens unit according to an aspect of the present disclosure includes: a solid immersion lens having a contact surface for coming into contact with a semiconductor device formed of a silicon substrate and a spherical surface to be disposed to face an objective lens, in which the solid immersion lens transmits light having at least a part of a wavelength in a range of 200 nm or greater and 1100 nm or lower; a holder holding the solid immersion lens; and an optical element held by the holder to be positioned between the objective lens and the solid immersion lens, in which the optical element corrects aberration caused by a difference in refractive indices between the silicon substrate and the solid immersion lens.

In this solid immersion lens unit, the solid immersion lens transmits light having at least a part of a wavelength in a range of 200 nm or greater and 1100 nm or lower. Accordingly, light having a wavelength shorter than the transmission wavelength region of silicon can be used for observation, and high-resolution observation can be realized. On the other hand, when such a solid immersion lens is used, there is a concern that aberration occurs due to a difference in refractive indices between the silicon substrate and the solid immersion lens. In this regard, in this solid immersion lens unit, the aberration is corrected by the optical element held by the holder so as to be positioned between the objective lens and the solid immersion lens. Therefore, according to the solid immersion lens unit, high resolution and clear observation can be realized. Note that when the silicon substrate is formed to be sufficiently thin, even light in a wavelength range of 200 nm or greater and 1100 nm or lower transmits through the silicon substrate.

The solid immersion lens may be made of GaAs, GaP, SiC or diamond. In this case, the transmission wavelength range of the solid immersion lens can be shorter than the transmission wavelength range of silicon.

The holder may have an attachment portion attachable to and detachable from the objective lens. In this case, the solid immersion lens unit can be easily changed.

The optical element may be made of glass. In this case, the aberration caused by the difference in refractive indices between the silicon substrate and the solid immersion lens can be suitably corrected.

The optical element may be a meniscus lens. In this case, it is possible to more suitably correct the aberration caused by the difference in refractive indices between the silicon substrate and the solid immersion lens.

A semiconductor inspection apparatus according to an aspect of the present disclosure includes: an stage on which semiconductor device is to be placed; an objective lens disposed to face the semiconductor device on the stage; the solid immersion lens unit that holds a solid immersion lens between the objective lens and the semiconductor device; and a photodetector that detects light from the semiconductor device through the solid immersion lens and the objective lens. For the reasons described above, this semiconductor inspection apparatus can realize high-resolution and clear observation.

The plurality of solid immersion lens units may be configured to correspond to different observation depths, respectively. In this case, the solid immersion lens unit can be selected in accordance with the observation depth, and observation in accordance with the depth of the silicon substrate can be realized.

Advantageous Effects of Invention

According to the present disclosure, it is possible to provide a solid immersion lens unit capable of achieving high-resolution and clear observation, and a semiconductor inspection apparatus including such a solid immersion lens unit.

DESCRIPTION OF EMBODIMENTS

Figure 1:
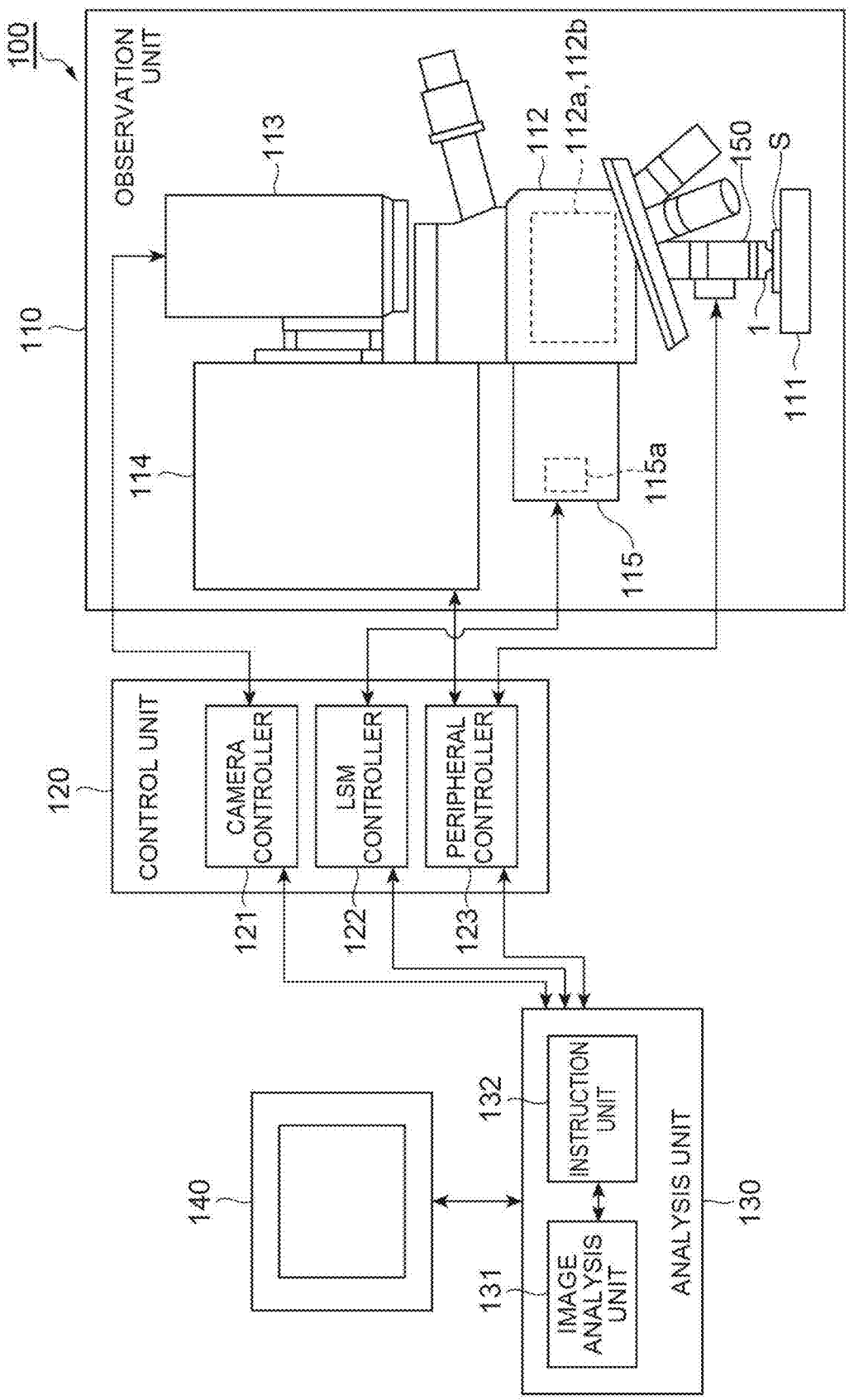
FIG. 1 is a configuration diagram of a semiconductor inspection apparatus according to an embodiment.

Hereinafter, an embodiment of the present disclosure will be described in detail with reference to the drawings. In the following description, the same reference numerals are used for the same or corresponding element, and redundant description is omitted.

[Configuration of Semiconductor Inspection Apparatus]

A semiconductor inspection apparatus 100 shown in FIG. 1 is an apparatus for acquiring an image of a semiconductor device S and inspecting internal information of the semiconductor device S. The semiconductor device S is formed by, for example, forming a plurality of elements in a silicon substrate. That is, the semiconductor device S is formed of a silicon substrate. The semiconductor device S is, for example, an individual semiconductor element (discrete), an optoelectronic element, a sensor/actuator, a logic LSI (Large Scale Integration), a memory element, or a linear IC (Integrated Circuit), or the like, or a hybrid device thereof. The individual semiconductor element includes a diode, a power transistor, or the like. The logic LSI is constituted of a transistor having a MOS (Metal-Oxide-Semiconductor) structure, a transistor having a bipolar structure, or the like. The semiconductor device S may be a package, a composite substrate, or the like including the semiconductor device.

Figure 2:
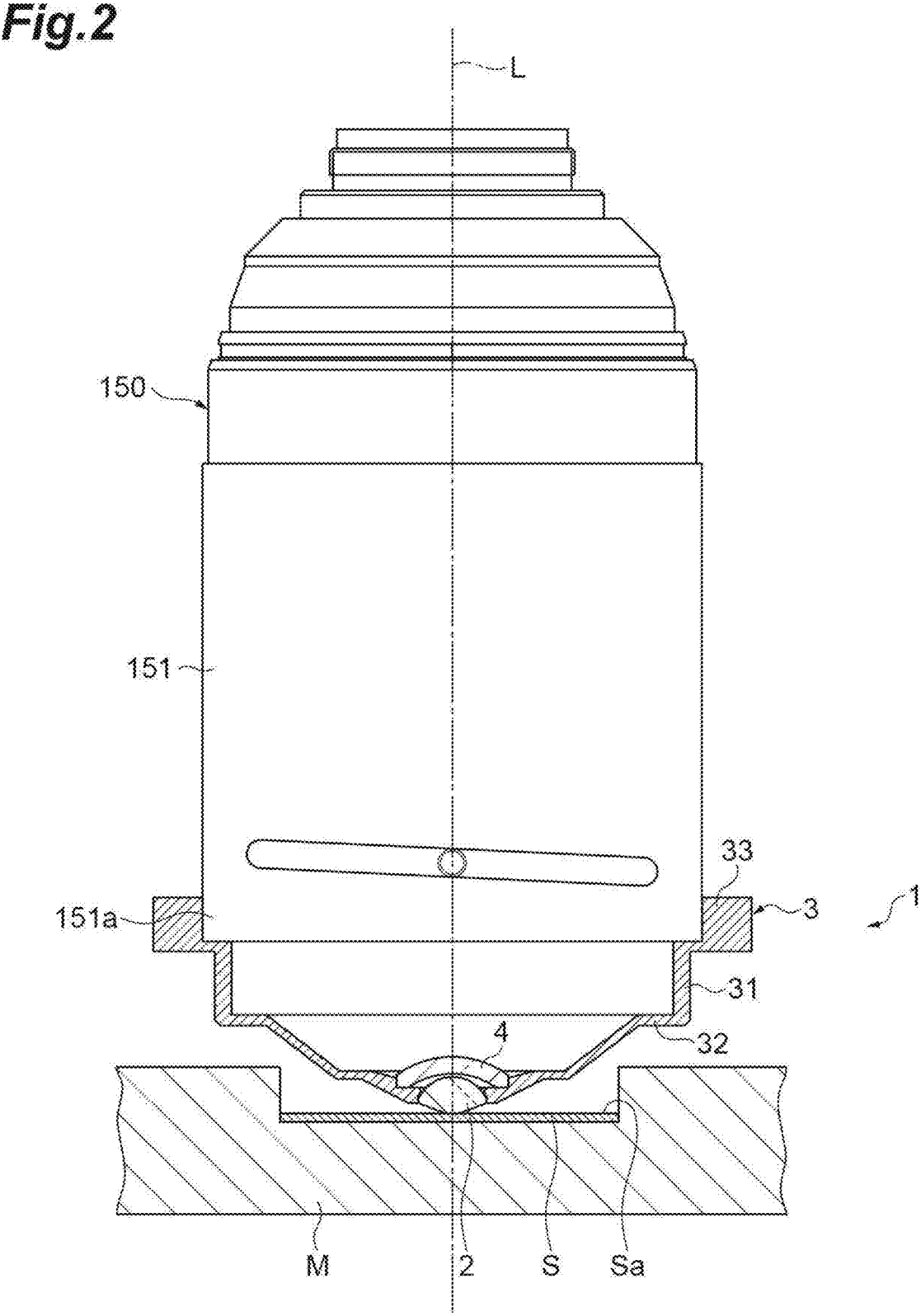
FIG. 2 is a cross-sectional view of the solid immersion lens unit.

The internal information to be inspected includes information on a circuit pattern of the semiconductor device S, information on weak light emission from the semiconductor device S (light emission caused by a defect of the semiconductor device S, transient light emission caused by a switching operation of a transistor in the semiconductor device S, or the like), information on heat generation caused by a defect of the semiconductor device, or the like. As shown in FIG. 2, the semiconductor device S may be, for example, a molded semiconductor device that is molded with a resin M so that the surface Sa is exposed. The surface Sa is a surface of the semiconductor device S opposite to a surface on which a device (such as an integrated circuit) is formed.

As shown in FIG. 1, the semiconductor inspection apparatus 100 includes an observation unit 110, a control unit 120, an analysis unit 130, and a display device 140. The observation unit 110 observes the semiconductor device S. The control unit 120 controls the operation of the observation unit 110. The analysis unit 130 performs processing, instructions, or the like necessary for inspection of the semiconductor device S. The display device 140 is electrically connected to the analysis unit 130, and displays images, data, or the like acquired or analyzed by the analysis unit 130. The display device 140 is, for example, a display.

The observation unit 110 includes a stage 111, an optical system 112, a two-dimensional camera (photodetector) 113, a moving mechanism 114, and a LSM (Laser Scanning Microscope) unit 115. The semiconductor device S is placed on the stage 111 in a state where the surface Sa face the optical system 112 side. The moving mechanism 114 moves the optical system 112, the two-dimensional camera 113, and the LSM unit 115.

The optical system 112 includes a plurality of objective lenses 150, a camera optical system 112a, and an LSM unit optical system 112b. The magnifications of the plurality of objective lenses 150 are different from each other. One objective lens 150 selected from the plurality of objective lenses 150 is disposed so as to face the surfaces Sa of the semiconductor device S placed on the stage 111.

As shown in FIG. 1, the camera optical system 112a guides light from the semiconductor device S to the two-dimensional camera 113. The two-dimensional camera 113 detects light guided by the camera optical system 112a (light having passed through the optical system 112). The two-dimensional camera 113 can output image data for creating an image of a circuit pattern or the like of the semiconductor device S. For example, a CCD area image sensor, a CMOS area image sensor, or the like is mounted on the two-dimensional camera 113. The two-dimensional camera 113 may be, for example, an InGaAs camera, an InSb camera, an MCT camera, or the like.

The LSM unit optical system 112b guides the laser beam emitted from the LSM unit 115 to the semiconductor device S, and guides the laser beam reflected by the semiconductor device S to the LSM unit 115. The LSM unit optical system 112b includes an optical scanning unit such as a galvanometer mirror, a polygon mirror, or a MEMS mirror, and scans the semiconductor device S with laser light.

The LSM unit 115 emits a laser beam generated by a light source and detects the laser beam reflected by the semiconductor device S by a photodetector 115a. The light source may generate, for example, CW (Continuous Wave) light or pulsed light with which the semiconductor device S is irradiated. The light generated by the light source may be incoherent light as well as coherent light such as laser light. As a light source that outputs coherent light, a solid-state laser light source, a semiconductor laser light source, or the like can be used. As a light source that outputs incoherent light, a SLD (Super Luminescent Diode), an ASE (Amplified Spontaneous Emission), a LED (Light Emitting Diode), or the like can be used.

The photodetector 115a is, for example, an avalanche photodiode, a photodiode, a photomultiplier tube, a superconducting single photon detector, or the like. The intensity of the laser light detected by the photodetector 115a reflects the circuit pattern of the semiconductor device S. Therefore, the photodetector 115a can output image data for creating an image of a circuit pattern or the like of the semiconductor device S.

The control unit 120 includes a camera controller 121, an LSM controller 122, and a peripheral controller 123. The camera controller 121 is electrically connected to the two-dimensional camera 113. The LSM controller 122 is electrically connected to the LSM unit 115. The camera controller 121 and the LSM controller 122 control the operations of the two-dimensional camera 113 and the LSM unit 115 respectively, thereby controlling the execution of observation of the semiconductor device S (acquisition of an image), the setting of observation conditions of the semiconductor device S, or the like.

The peripheral controller 123 is electrically connected to the moving mechanism 114. The peripheral controller 123 controls the operation of the moving mechanism 114 to move and align the optical system 112, the two-dimensional camera 113, and the LSM unit 115.

The analysis unit 130 includes an image analysis unit 131 and an instruction unit 132. The analysis unit 130 is configured by, for example, a computer including a processor (CPU), a RAM and a ROM which are recording media. The analysis unit 130 is electrically connected to each of the camera controller 121, the LSM controller 122, and the peripheral controller 123. The image analysis unit 131 creates an image based on image data output from each of the camera controller 121 and the LSM controller 122, and executes analysis processing or the like.

The instruction unit 132 refers to the input content by the operator, the analysis content by the image analysis unit 131, or the like, and instructs the control unit 120 to execute the inspection of the semiconductor device S in the observation unit 110. An operation unit (not shown) is electrically connected to the analysis unit 130. The user operates the semiconductor inspection apparatus 100 by operating the operation unit. The operation unit is, for example, a mouse, a keyboard, or the like. The operation unit may be, for example, a touch panel built in the display device 140.

[Configuration of Solid Immersion Lens Unit]

The optical system 112 further includes a solid immersion lens unit 1 in addition to the objective lens 150 and the like described above. As shown in FIG. 2, the solid immersion lens unit 1 includes a solid immersion lens 2, a holder 3, and an optical element 4. In the following description, in a state where the surface Sa of the semiconductor device S placed on the stage 111 and the objective lens 150 face each other, a side on which the objective lens 150 is positioned with respect to the semiconductor device S is defined as an upper side, and a side on which the semiconductor device S are positioned with respect to the objective lens 150 is defined as a lower side.

Figure 3:
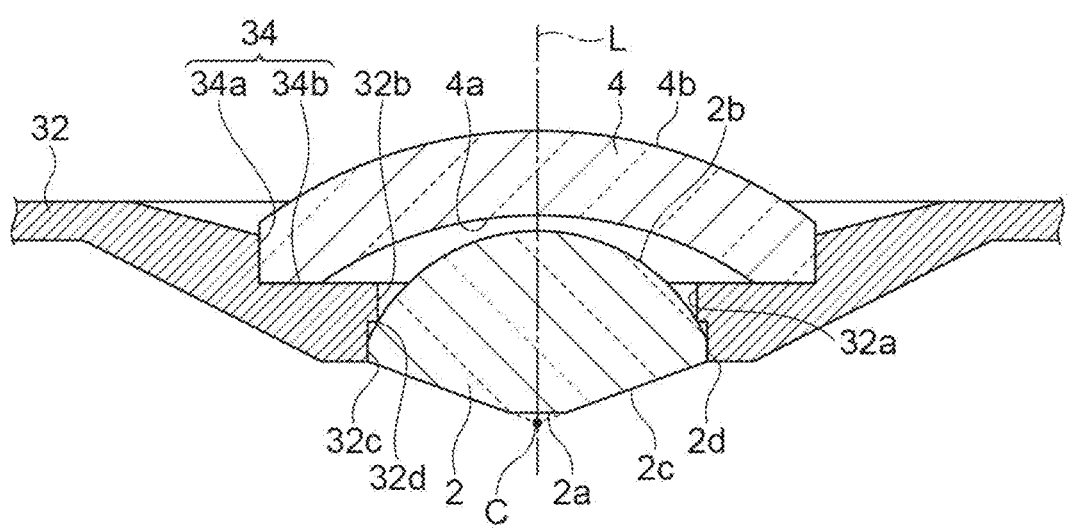
FIG. 3 is a partial cross-sectional view of the solid immersion lens unit.

As shown in FIG. 3, the solid immersion lens 2 has a contact surface 2a, a spherical surface 2b, a tapered surface 2c, and a peripheral surface 2d. The contact surface 2a is a flat surface and contacts the surface Sa of the semiconductor device S. The spherical surface 2b is a hemispherical surface convex upward and faces the objective lens 150. The tapered surface 2c is a surface having a truncated cone shape expanding upward, and extends upward from the outer edge of the contact surface 2a. The peripheral surface 2d is a cylindrical surface and is connected to the outer edge of the spherical surface 2b and the outer edge of the tapered surface 2c. The vertex of the virtual cone including the tapered surface 2c coincides with the spherical center C of the solid immersion lens 2 (the center of curvature of the spherical surface 2b), and is located on the optical axis L at the lower side of the contact surface 2a. The spherical center C coincides with the focal point of the solid immersion lens 2.

The solid immersion lens 2 is made of a material different from silicon, such as GaAs, GaP, SiC, or diamond. When the solid immersion lens 2 is made of GaAs, it transmits light in the range of about 900 nm or greater and 2 μm lower. When the solid immersion lens 2 is made of GaP, it transmits light in the range of about 550 nm or greater and 2 μm lower. When the solid immersion lens 2 is made of SiC, it transmits light in the range of about 400 nm or greater and 2 μm or lower. When the solid immersion lens 2 is made of diamond, it transmits light in the range of about 200 nm or greater and 2 μm or lower. That is, the solid immersion lens 2 transmits light having at least a part of the wavelength in the range of 200 nm or greater and 1100 nm or lower, regardless of which of GaAs, GaP, and diamond is used.

As shown in FIGS. 2 and 3, the solid immersion lens 2 is held by the holder 3 so as to be positioned between the objective lens 150 and the semiconductor device S. The holder 3 includes a side wall portion 31, a bottom wall portion 32, and an attachment portion 33. The holder 3 is formed in a cap shape from a non-magnetic material (for example, aluminum, an aluminum alloy, non-magnetic stainless steel, or the like). The side wall portion 31 is formed in a cylindrical shape. The bottom wall portion 32 is formed integrally with the side wall portion 31 so as to close the lower opening of the side wall portion 31.

As shown in FIG. 3, an opening 32a in which the solid immersion lens 2 is disposed is formed in the bottom wall portion 32. The opening 32a is disposed on the optical axis L, and is opened upward and downward. The inner surface of the opening 32a includes a first surface 32b defining an upper edge and a second surface 32c defining a lower edge. The upper edge and the lower edge of the opening 32a are each formed in a circular shape centered on the optical axis L, and a radius of a circle defined by the upper edge is smaller than a radius of a circle defined by the lower edge. A step portion 32d is formed between the first surface 32b and the second surface 32c.

The solid immersion lens 2 is disposed in the opening 32a so that the contact surface 2a and the tapered surface 2c protrude downward from the lower edge of the opening 32a, and a part of the spherical surface 2b protrudes upward from the upper edge of the opening 32a. The solid immersion lens 2 is fixed to the holder 3, for example, by bonding the peripheral surface 2d to the second surface 32c of the opening 32a. In this fixed state, the step portion 32d is in contact with the spherical surface 2b.

The optical element 4 is, for example, a meniscus lens made of glass. The optical element 4 has a first surface 4a and a second surface 4b opposite to the first surface 4a. The first surface 4a is concavely curved toward the second surface 4b side. The second surface 4b is convexly curved toward the side opposite to the first surface 4a. That is, the optical element 4 has a concave surface and a convex surface facing each other. For example, the optical element 4 is formed in a circular shape when viewed from a direction in which the first surface 4a and the second surface 4b face each other.

The optical element 4 is held by the holder 3 so as to be positioned between the objective lens 150 and the solid immersion lens 2. More specifically, the holder 3 is provided with a holding portion 34 for holding the optical element 4, and the optical element 4 is held by the holding portion 34. The holding portion 34 is constituted by, for example, a step portion extending so as to surround the opening 32a. The optical element 4 is fixed to the holder 3, for example, by being bonded to the surface 34a and the surface 34b constituting the step portion. In this fixed state, the center of the optical element 4 when viewed from a direction parallel to the optical axis L is located on the optical axis L. The first surface 4a of the optical element 4 faces the spherical surface 2b of the solid immersion lens 2 at a predetermined interval and extends along the spherical surface 2b of the solid immersion lens 2.

The optical element 4 is disposed to correct aberration caused by a difference in refractive indices between the solid immersion lens 2 and the silicon substrate constituting the semiconductor device S. The material, shape, and arrangement of the optical element 4 are determined so that the aberration is substantially eliminated, for example.

The attachment portion 33 is provided, for example, at an upper end portion of the side wall portion 31. The attachment portion 33 is detachably attached to the lower end portion 151a of the lens barrel 151 of the objective lens 150. Thus, the holder 3 is attachable to and detachable from the objective lens 150. The attachment portion 33 may have any configuration as long as it is detachable from the objective lens 150. For example, a screw may be inserted into a screw hole formed in the attachment portion 33, and the screw may be screwed into the lens barrel 151 of the objective lens 150. Alternatively, a magnet may be disposed in the attachment portion 33, and the attachment portion 33 may be attached to the objective lens 150 by the magnetic force of the magnet.

[Example of Image Acquisition Method in Semiconductor Inspection Apparatus]

In the semiconductor inspection apparatus 100, the observation portion of the semiconductor device S is specified using the objective lens 150 to which the solid immersion lens unit 1 is not attached. The specification of the observation portion is performed by an instruction to the peripheral controller 123 by the instruction unit 132 and control of driving of the moving mechanism 114 by the peripheral controller 123.

Subsequently, it is switched to the objective lens 150 to which the solid immersion lens unit 1 is attached, and the contact surface 2a (see FIG. 3) of the solid immersion lens 2 is brought into close contact with the surface Sa of the semiconductor device S. The close contact of the contact surface 2a of the solid immersion lens 2 is performed by an instruction to the peripheral controller 123 by the instruction unit 132 and control of driving of the moving mechanism 114 by the peripheral controller 123.

Subsequently, the objective lens 150 to which the solid immersion lens unit 1 is attached is focused. The focusing of the objective lens 150 is performed by an instruction from the instruction unit 132 to the peripheral controller 123 and control of driving of the moving mechanism 114 by the peripheral controller 123.

Subsequently, the observation portion of the semiconductor device S is observed. The observation of the observation portion is performed by the instruction to each of the camera controller 121 and the LSM controller 122 by the instruction unit 132 and the control of the operation of each of the two-dimensional camera 113 and the LSM unit 115. During observation, light from the semiconductor device S is detected by the two-dimensional camera 113 through the solid immersion lens 2, the optical element 4, and the objective lens 150. The semiconductor inspection apparatus 100 can be applied to an analysis technique such as EOP (Electro Optical Probing) or EOFM (Electro Optical Frequency Mapping). In these analysis techniques, failure analysis of a logic device being driven is performed based on intensity modulation of light from the device.

[Function and Effect]

As described above, in the solid immersion lens unit 1, the solid immersion lens 2 transmits light having at least a part of the wavelength in the range of 200 nm or greater and 1100 nm or lower. Accordingly, light having a wavelength shorter than the transmission wavelength region of silicon can be used for observation, and high-resolution observation can be realized. On the other hand, when such a solid immersion lens 2 is used, there is a concern that aberration may occur due to a difference in refractive indices between the solid immersion lens 2 and the silicon substrate constituting the semiconductor device S. In this regard, in the solid immersion lens unit 1, the aberration is corrected by the optical element 4 held by the holder 3 so as to be positioned between the objective lens 150 and the solid immersion lens 2. Therefore, according to the solid immersion lens unit 1, high resolution and clear observation can be realized. In the above-described example, the silicon substrate constituting the semiconductor device S is formed to be sufficiently thin so that light in a wavelength range of 200 nm or greater and 1100 nm or lower can be transmitted.

In the semiconductor inspection apparatus 100 including the solid immersion lens unit 1, since the aberration is corrected by the optical element 4, it is not necessary to provide a correction ring for aberration correction in the objective lens 150, and the number of components can be reduced. Further, according to the solid immersion lens unit 1, it is possible to improve the accuracy of observation as compared with the case where the aberration is corrected by the correction ring. That is, the correction ring is generally configured to be slidable along a direction parallel to the optical axis L. In this case, since the formation of a gap is inevitable in the direction perpendicular to the optical axis L in the slide mechanism, there is a possibility that the position of the correction ring is shifted by the gap. In contrast, in the semiconductor inspection apparatus 100 including the solid immersion lens unit 1, since it is not necessary to provide the correction ring in the objective lens 150, the observation accuracy can be improved.

In the solid immersion lens unit 1, the solid immersion lens 2 is made of GaAs, GaP, SiC, or diamond. Accordingly, the transmission wavelength range of the solid immersion lens 2 can be shorter than the transmission wavelength range of silicon.

In the solid immersion lens unit 1, the holder 3 has the attachment portion 33 that is attachable to and detachable from the objective lens 150. Thus, the solid immersion lens unit 1 can be easily changed.

In the solid immersion lens unit 1, the optical element 4 is made of glass. As a result, it is possible to suitably correct the aberration caused by the difference in refractive indices between the solid immersion lens 2 and the silicon substrate.

In the solid immersion lens unit 1, the optical element 4 is a meniscus lens. This makes it possible to more suitably correct the aberration caused by the difference in the refractive indices between the solid immersion lens 2 and the silicon substrate.

[Modification]

Although an embodiment of the present disclosure has been described above, the present disclosure is not limited to the above-described embodiment. For example, the material and shape of each component are not limited to those described above, and various materials and shapes can be adopted.

The material and shape of the optical element 4 are not limited to the above-described examples, as long as the optical element 10 can correct aberration caused by a difference in refractive indices between the solid immersion lens 2 and the silicon substrate constituting the semiconductor device S. The optical element 4 may include a plurality of elements. The concave surface and the convex surface constituting the optical element 4 may include a spherical surface or an aspherical surface such as a surface constituting a Schmidt plate.

A correction ring for aberration correction and a motor for adjusting the correction ring may be attached to the objective lens 150. In this case, by driving the motor to adjust the correction ring, it is possible to reliably focus the objective lens 150 on a position to be observed.

The semiconductor inspection apparatus 100 may include a plurality of solid immersion lens units 1. The plurality of solid immersion lens units 1 are configured to correspond to different observation depths, respectively. The observation depth is a distance from the surface Sa of the semiconductor device S to a position to be observed (the thickness of the silicon substrate). In each solid immersion lens unit 1, for example, the material, shape, and arrangement of the solid immersion lens 2 and the optical element 4 are determined so that aberration is substantially eliminated at a target observation depth. For example, at the time of observation, one solid immersion lens unit 1 selected from the solid immersion lens units 1 is attached to the objective lens 150. According to such a semiconductor inspection apparatus 100, the solid immersion lens unit 1 can be selected in accordance with the observation depth, and observation in accordance with the depth of the silicon substrate can be realized. In order to easily select an appropriate solid immersion lens unit 1, a corresponding observation depth may be described on the surface of the holder 3. In the plurality of solid immersion lens units 1, the shapes of the holders 3 may be different from each other. In this case, the solid immersion lens unit 1 can be selected so as to avoid interference between the holder 3 and members around the semiconductor device S.

In the above embodiment, the solid immersion lens 2 is fixed to the holder 3, but the solid immersion lens 2 may be swingably held by the holder 3. For example, the holder 3 may have a larger accommodation space than the solid immersion lens 2, and the solid immersion lens 2 may be accommodated in the accommodation space. In this case, when the contact surface 2a of the solid immersion lens 2 is brought into close contact with the surface Sa of the semiconductor device S, the solid immersion lens 2 swings in the accommodation space and the contact surface 2a is brought into close contact with the surface Sa, so that good close contact between the solid immersion lens 2 and the semiconductor device S can be achieved. The contact surface 2a of the solid immersion lens 2 is not necessarily a flat surface, and may be, for example, a convex surface.

REFERENCE SIGNS LIST

1: solid immersion lens unit, 2: solid immersion lens, 2a: contact surface, 2b: spherical surface, 3: holder, 33: attachment portion, 4: optical element, 100: semiconductor inspection apparatus, 111: stage, 113: two-dimensional camera (photodetector), 150: objective lens, S: semiconductor device:

The invention claimed is:

1. A solid immersion lens unit comprising:
a solid immersion lens having a contact surface for coming into physical contact with a semiconductor device formed of a silicon substrate and a spherical surface to be disposed to face an objective lens, wherein the solid immersion lens transmits light having at least a part of wavelength in a range of 200 nm or greater and 1100 nm or lower;
a holder holding the solid immersion lens; and
an optical lens held by the holder to be positioned between the objective lens and the solid immersion lens,
wherein the optical lens corrects aberration caused by a difference in refractive indices between the silicon substrate and the solid immersion lens,
wherein the solid immersion lens is made of GaAs, GaP, SiC, or diamond,
wherein the optical lens is made of a material different from that of the solid immersion lens,
wherein the optical lens is bonded to a step portion extending so as to surround an opening of the holder, and
a surface of the optical lens faces the spherical surface of the solid immersion lens at a predetermined interval and extends along the spherical surface of the solid immersion lens.

2. The solid immersion lens unit according to claim 1, wherein the holder has an attachment portion attachable to and detachable from the objective lens.

3. The solid immersion lens unit according to claim 1, wherein the optical lens is made of glass.

4. The solid immersion lens unit according to claim 1, wherein the optical lens is a meniscus lens.

5. A semiconductor inspection apparatus comprising:
an stage on which the semiconductor device is to be placed;
an objective lens disposed to face the semiconductor device on the stage;
the solid immersion lens unit according to claim 1 that holds the solid immersion lens between the objective lens and the semiconductor device; and
a photodetector that detects light from the semiconductor device through the solid immersion lens and the objective lens.

6. The semiconductor inspection apparatus according to claim 5, comprising a plurality of the solid immersion lens units, wherein the plurality of solid immersion lens units are configured to correspond to different observation depths.

* * * * *